Jan. 12, 1971  S. BERTRAM  3,554,645
AUTOMATIC MAPPING SYSTEM HAVING A MECHANICALLY AND ELECTRONICALLY
CONTROLLED SCANNING MEANS FOR PROVIDING
FASTER RESPONSE

Filed Jan. 24, 1966  5 Sheets-Sheet 1

INVENTOR.
SIDNEY BERTRAM
BY
Abraham Wasserman
ATTORNEY

INVENTOR.
SIDNEY BERTRAM
BY
ATTORNEY

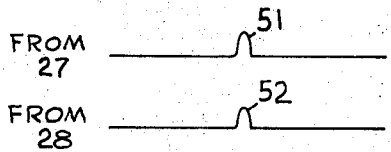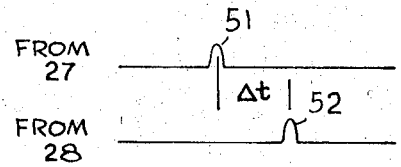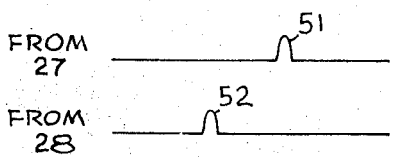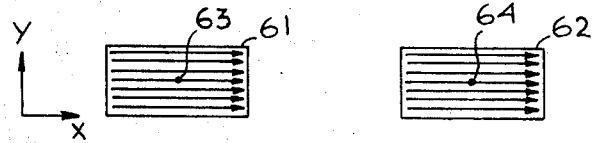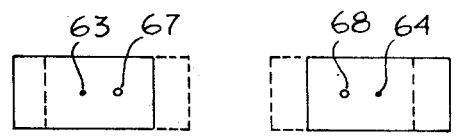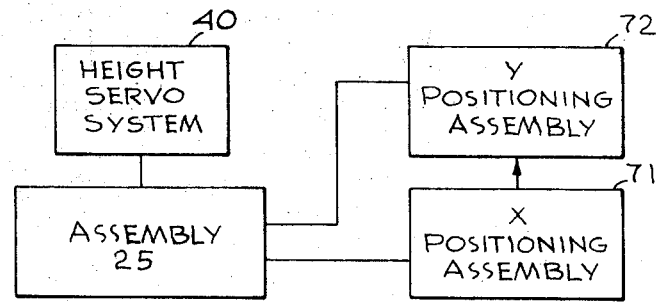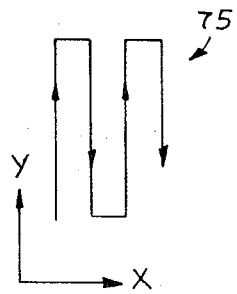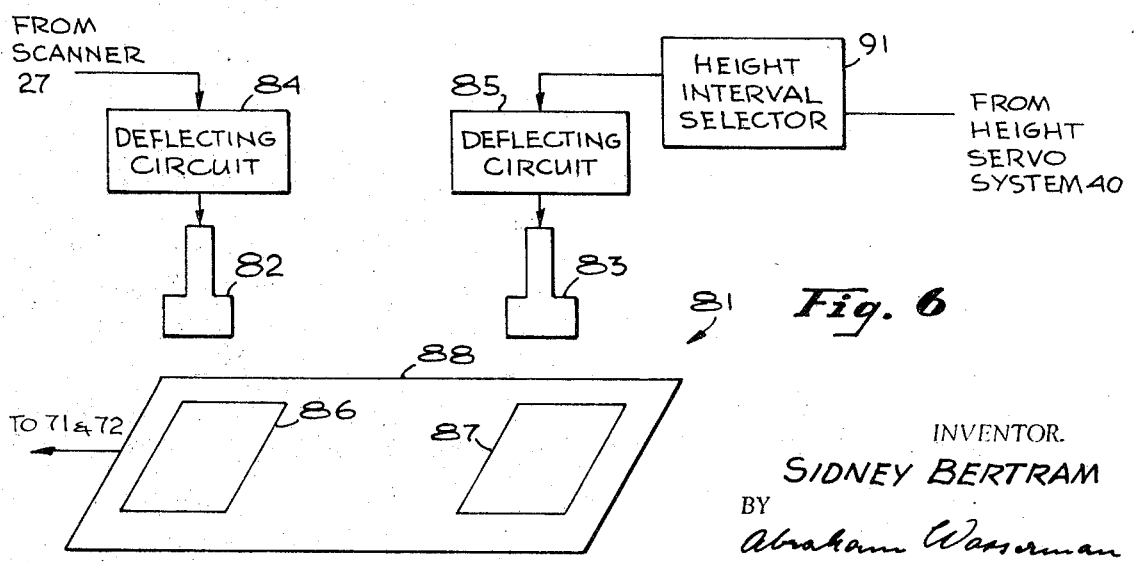

INVENTOR.
SIDNEY BERTRAM
BY
ATTORNEY

United States Patent Office 3,554,645
Patented Jan. 12, 1971

3,554,645
AUTOMATIC MAPPING SYSTEM HAVING A MECHANICALLY AND ELECTRONICALLY CONTROLLED SCANNING MEANS FOR PROVIDING FASTER RESPONSE
Sidney Bertram, Woodland Hills, Calif., assignor to The Bunker-Ramo Corporation, Stamford, Conn., a corporation of Delaware
Filed Jan. 24, 1966, Ser. No. 522,671
Int. Cl. G01c 11/12
U.S. Cl. 356—2
19 Claims

ABSTRACT OF THE DISCLOSURE

An automatic stereomapping system incorporating a mechanically and electronically controlled scanning arrangement. In one embodiment means are provided for electronically controlling the positioning of the scanning means in accordance with the detected time displacement of the signals obtained as a result of scanning each incremental area so as to electronically compensate for any height error without having to wait for mechanical compensation. In another embodiment electronic differential delay means are used to eliminate any time displacement between the signals obtained from scanning. In the first embodiment a measure of height is obtained in response to the mechanical and electronic positions of the scanning means, and in the second embodiment is obtained in response to the mechanical position of the scanning means and the amount of differential delay required to compensate for any time displacement between the signals obtained from scanning.

---

This invention relates to an automated photogrammetric system and, more particularly, to an improved system for obtaining data from stereo photographs.

In the field of photogrammetry, several basic stereoscopic plotting instruments are presently in use for deriving map information from pairs of stereoscopic photographs. Basically, in such instruments a stereoscopic model or image of the photographic information, such as terrain, is optically created. A reference mark is then adjusted to appear on the surface of an incremental area of the stereoscopic model. The position of the mark with respect to a predetermined position reference is used as a measure of the relative three-dimensional position of the incremental area in the photographed terrain.

In copending application Ser. No. 199,797, entitled "Automatic Stereomapping System," filed on June 4, 1962, now abandoned in favor of Ser. No. 661,466, filed Aug. 17, 1967 which has issued into Pat. No. 3,473,875 by the applicant of the present application and assigned to the assignee of the present application, a novel system incorporating an automated stereoscopic plotting instrument is disclosed. Therein, the invention is described in conjunction with a Kelsh plotter, which is an instrument in which a stereoscopic model is optically projected by a pair of projectors from a pair of stereoscopic photographs.

In a Kelsh plotter, a tracing platen is selectively positionable with respect to the stereoscopic model. In normal operation, the height of the platen is manually adjusted to be at the surface of a selected incremental area on the stereoscopic model so that the adjusted height of the platen corresponds to the height of the selected incremental area. Alternatively, the platen is moved around to find a set of incremental areas of the same elevation. By moving the platen in a predetermined pattern about the stereoscopic model and at successive points or incremental areas adjusting its height to conform to the surface of the stereoscopic model, the heights of successive incremental areas of terrain along the pattern are determined. The platen may also be moved around the stereoscopic model to find a set of incremental areas which are at the same elevation.

In the automated stereomapping system, the platen is replaced by a single mechanical scanner. The scanner is automatically moved about the stereoscopic model in a predetermined pattern so that terrain imagery of successive incremental terrain areas or portions along the pattern are brought into the field of view. The height of the scanner, which is automatically adjusted to conform to the surface height of the stereoscopic model, is recorded, thereby providing a record of the height of successive portions of the photographed terrain.

In operation, the scanner simultaneously scans images projected by the two projectors. The resulting related electrical signals are in turn compared on the basis of the time coincidence between mutually coherent elements therein. If the surface of the scanner is in contact with the terrain surface defined by the stereoscopic image, then corresponding image elements of the images are scanned in exact time coincidence, and therefore mutually coherent or "correlating" elements of the two electrical signals appear in time coincidence. However, if the surface of the scanner is not at the proper height, then corresponding elements of the two projected images are not scanned in time coincidence, and there is a time difference between correlating elements of the electrical signals. Such time differences are detected by means of a correlation circuit. The circuit produces height error signals indicative of the error in the height of the surface of the scanner with respect to the surface defined by the stereoscopic model. The height error signals are directly coupled to a servo system which mechanically changes the height of the scanner so that its surface remains in contact with the surface of the stereoscopic model.

From the copending application it should be appreciated that the rate at which height information can be derived by the system described therein is a function of the speed with which the servo system mechanically adjusts the position of the scanner so as to be in contact with the stereoscopic model. Since the servo system is mechanical, its response to the error signals is limited and sluggish; therefore the adjustment in the position of the scanner is gradual rather than instantaneous. As long as the scanner is not properly positioned, the height error signals continue to accumulate so that, for any given error in the height of the scanner, areas of high image detail produce larger error signals than areas of lower image detail. Consequently, the height error signals are not only a function of the error in the position of the scanner, but are also dependent on the image characteristics of the photographs. The gain of the servo system may be increased to increase the response of the servo system to the height error signals. However, the dependency of the error signals on imagery quality limits the maximum allowable gain, which must be carefully controlled so that the system does not become unstable as a result of error signals produced by areas of very high imagery details.

The automated stereomapping system of the previously mentioned application greatly advances the state of the art by satisfactorily deriving height information from stereoscopic photographs. From photographs of relatively uniform image detail, the information can be derived without any interruption in the automatic operation. However, when using photographs characterized by extreme variations in image detail, the continuous automatic operation of the prior system is sometimes interrupted, requiring the services of an operator to partially guide the operation of the system until the automatic mode of operation can be resumed.

The occasional interruptions occurring in the prior art system and the limited rate of deriving the height information, which are caused by the limited response of the mechanical servo system, are substantially eliminated in the improved automatic stereomapping system of the present invention.

Basically, the system of the present invention incorporates a scanning arrangement which is mechanically as well as electronically automatically adjusted with respect to the photographs producing the stereoscopic model, to produce accumulated error signals which are substantially independent of the limited response of the mechanical servo system. The height error signals are substantially a function of only the error in the position of the scanning arrangement with respect to the photographs producing the stereoscopic model, the signals being independent of the detail qualities of the imagery in the photographs. Consequently, the automatic mode of operation of the system of the present invention is not subject to interruptions due to extreme variations in the detail qualities of the imagery which may be present in any of the photographs. Also, since the height error signals are only a function of the error in the position of the scaning arrangement with respect to the photographs being independent of the imagery qualities, the gain of the mechanical servo may be substantially increased so that the servo system may adjust the position of the scanning arrangement, as fast as mechanically possible, to be in proper relationship with respect to the photographs.

These and other advantages of the improved automatic stereomapping system are accomplished by incorporating in a scanning arrangement a pair of scanning devices, each of which has an effective scanning aperture or raster which can be controllably positioned one with respect to the other in response to a control signal. Each is used to scan the image of the particular terrain portion produced from one of the two stereoscopic photographs. The scanned images are converted into related electrical signals, which are then correlated to determine the time relationship or displacement between mutually coherent or correlating elements and produce related height error signals. These signals are used to control at electronic speeds the scanning operations of the two scanning devices with respect to the two stereoscopic photographs by rapidly and accurately modifying the scanning rasters to compensate for any height error. Consequently, any height error is compensated for at electronic speeds so that the height error signal is essentially independent of the quality of the imagery, with amplitude being essentially related to the height error of the scanning arrangement with respect to the photographs.

The height error signals are also supplied as input signals to a mechanical servo system which adjusts the relative positions of the scanners, thereby adjusting the positions of the scanning surfaces thereof with respect to the photographs, so that the height of the terrain portion represented by the scanned images may be determined. Since, by electronically compensating for error in the position of the scanners, the height error signals are directly related to the error, the gain of the mechanical servo system can be appreciably increased over the prior system. Consequently, the speed with which the height adjustments are made is greatly increased, thereby enabling the system to automatically derive the desired information at a faster rate than heretofore possible.

In another arrangement of the present invention, a single scanning element, such as that described in the previously mentioned copending application, is utilized to simultaneously scan images projected to produce the stereoscopic model. The resulting related electrical or video signals are compared for time coincidence of correlating elements therein in a manner similar to that described in the above mentioned copending application. Any time differences between correlating elements are used to develop height error signals which, instead of being directly supplied to the scanning assembly so as to modify its height with respect to the stereoscopic model, are utilized to introduce a differential delay in the video signals to eliminate any time difference between correlating elements thereof; namely, the time relationship between the video signals is corrected to correspond to a situation where the scanning system is at the proper height with respect to the stereoscopic model.

The extent to which the time relationship between the video signals need be corrected is thus a measure of the error in the position of the scanning system, with respect to the desired position thereof, at the surface of the stereoscopic model. The extent of correcting the time relationship between the video signals is converted into appropriate height indicating signals. Such signals are combined with signals indicating the instantaneous height of the scanning system, so that the combined signals represent the actual height of the scanning system, without having to position the system at the actual height to determine its value. Consequently, the rate at which mapping data may be compiled is not limited by the sluggish response of the servo system, since desired height data may be derived without having to wait for the servo system to exactly position the scanning system at the surface of the stereoscopic model.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 2:
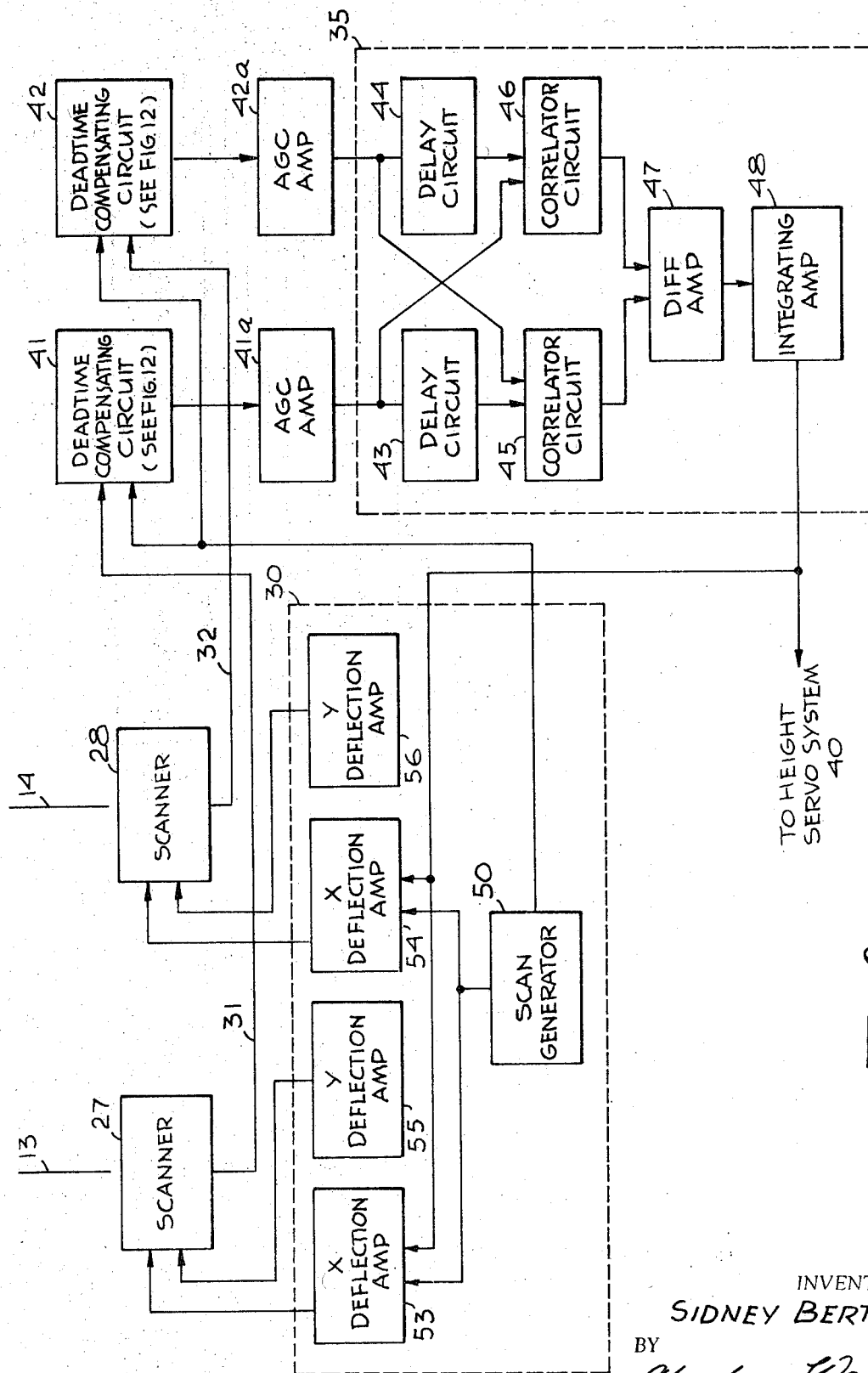
FIG. 2 is a block diagram of a part of the system shown in FIG. 1.
Figure 7:
Figure 8:
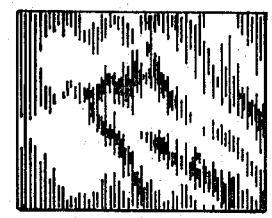
Figure 9:
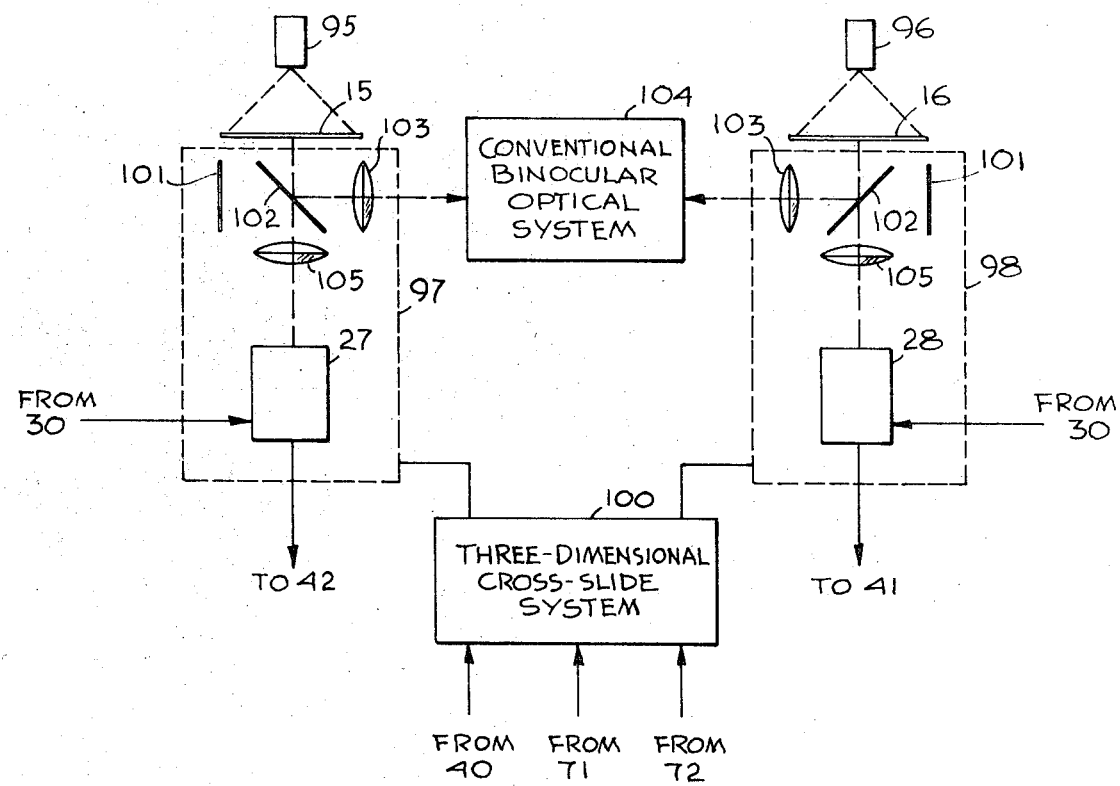
Figure 10:
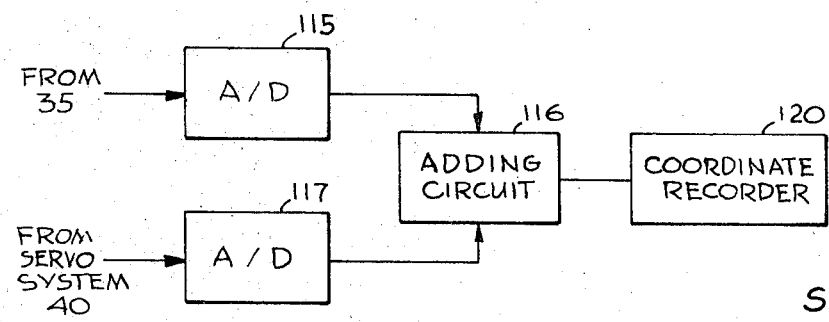
Figure 11:
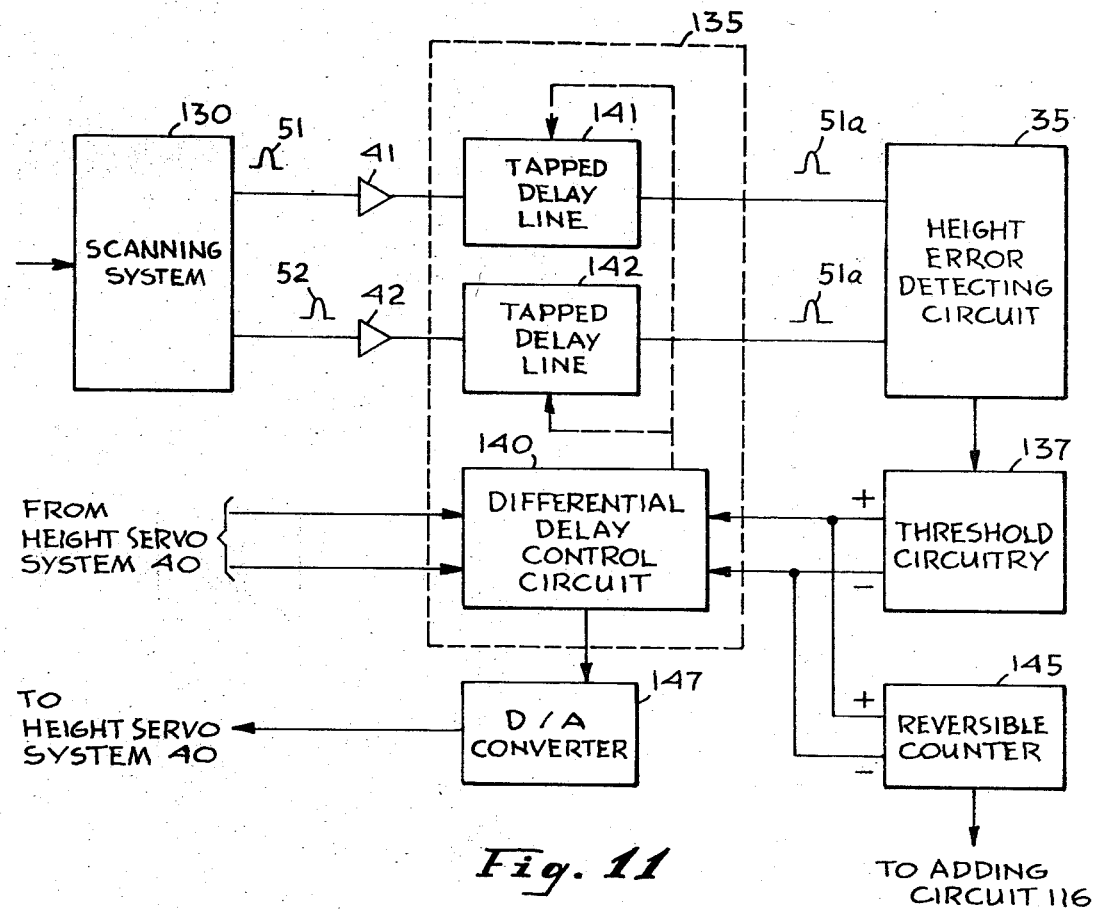
Figure 12:
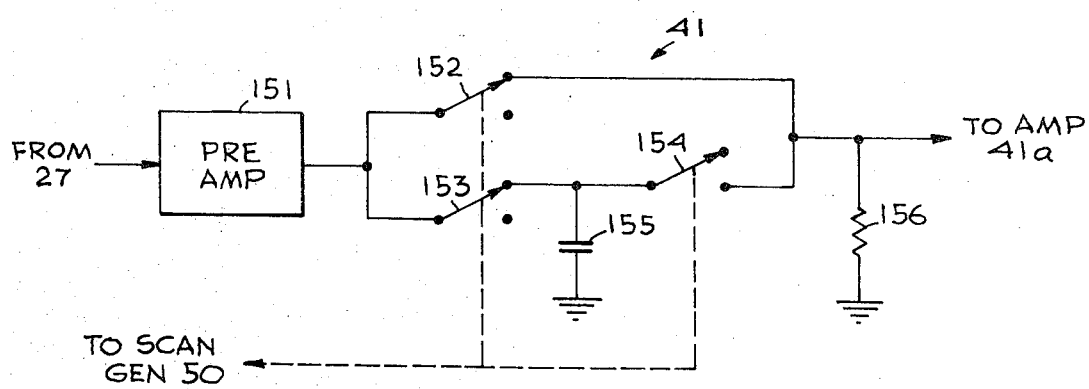

FIGS. 3(a), 3(b), and 3(c) are waveform diagrams of the system of the present invention;

FIGS. 4(a), 4(b), and 4(c) are diagrams of scanning rasters of the scanners incorporated in the system of the invention;

FIG. 5 is a block diagram of positioning assemblies used in conjunction with the scanning assembly of the present invention;

FIG. 6 is a simplified block and isometric view of an arrangement for producing desired output photographs of the improved stereomapping system;

FIGS. 7 and 8 are examples of a photograph in which incremental terrain areas are in orthographic projection and an altitude chart, respectively;

FIG. 9 is a simplified diagram of another arrangement of the stereomapping system of the present invention;

FIG. 10 is a partial block diagram of another embodiment of the system of the invention;

FIG. 11 is a block diagram of another embodiment of the system of the present invention; and FIG. 12 is a simplified diagram of a novel dead-time compensating circuit shown in FIG. 2.

In the following description the present invention will first be described in conjunction with a Kelsh plotter, it being understood, however, that the invention is not limited thereto but is applicable in conjunction with any stereomapping instrument wherein images of a terrain portion in a pair of stereoscopic photographs are used to stereoscopically recreate the terrain portion as part of a stereoscopic model. When used in conjunction with a Kelsh plotter, the present invention incorporates a scanning assembly which includes a pair of scanners, such as image dissectors or flying spot scanners. The assembly is positioned so that each scanner scans, with a predetermined raster, one of the images of the terrain portion projected by a corresponding projector. If the assembly is at a height with respect to a given reference plane which corresponds to the height of the particular terrain portion, then the two images will be coincidently scanned. Consequently, correlating elements of the converted electrical signals will be in time coincidence. However, if the assembly is not at the required height with respect to the plane of reference, then correlating elements of the imagery are not scanned in time coincidence.

The resulting electrical signals produce height error signals, which are used to modify the position of the scanning raster of one or both of the scanners, so that correlating imagery elements are scanned in time coincidence. The height error signals are also used to mechanically adjust the position of the assembly so that the scanning rasters of the scanners are at the proper height with respect to the stereoscopic photographs for the particular terrain portion. By electronically controlling the scanners to rapidly compensate for any height error, the secondary height signals are a linear function of the height error only. Such height error signals are then used to control the height of the scanning assembly to tightly track the stereoscopic image, regardless of the imagery quality of the projected images of each terrain portion which is being mapped.

Figure 1A:
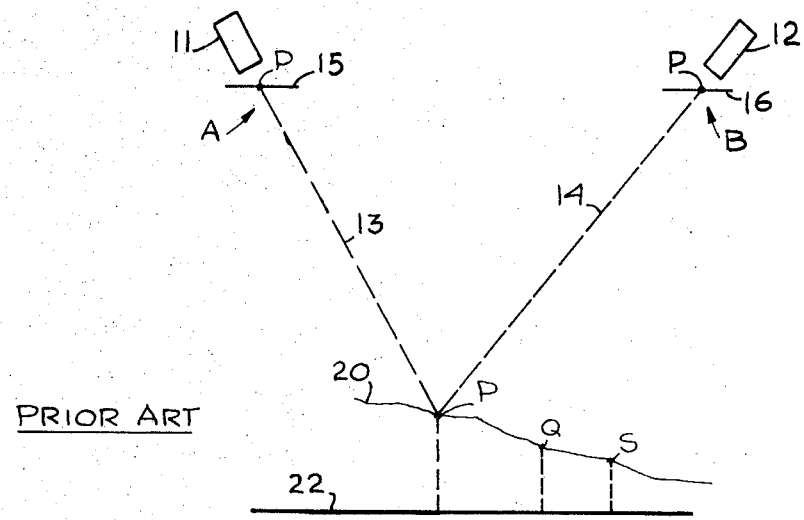
FIG. 1(a) is a simplified diagram useful in explaining the principles of operation of prior art systems.

Reference is now made to FIG. 1(a), which is a simplified diagrammatic representation useful in explaining the principles of operations of prior art systems used to develop information, such as height by automatically analyzing a pair of stereoscopic photographs. In FIG. 1(a), projectors 11 and 12 project, in the form of light beams 13 and 14, details of a terrain portion or incremental area P which appears in photographs 15 and 16 placed at positions A and B, respectively. The spacing between positions A and B is related to the spacing between the positions at which photographs 15 and 16 were actually taken. As is well known in the art of photogrammetry, the two light beams produce a stereoscopic model or image at a surface 20 at which the image details in the two light beams are in coincidence. Thus, the incremental area P appears in stereoscopic view on the surface of the stereoscopic model, which hereinafter will also be referred to as the stereo model.

The difference in height of points on the stereo model with respect to a reference plane 22 is related to the actual height differences of related points in the photographs. Therefore, by detecting the relative heights of the point P and such points as Q and S with respect to the plane 22, the relative heights of the points P, Q and S, as reproduced in the stereoscopic photographs, may be determined. In the automatic stereomapping system described in the application referred to previously, a single mechanical scanner, such as a Nipkow disc, is used to scan both light beams 13 and 14. The scanned images produce signals which are used to control the height of the scanner so that it is in contact with the surface of stereo model 20.

Figure 1B:
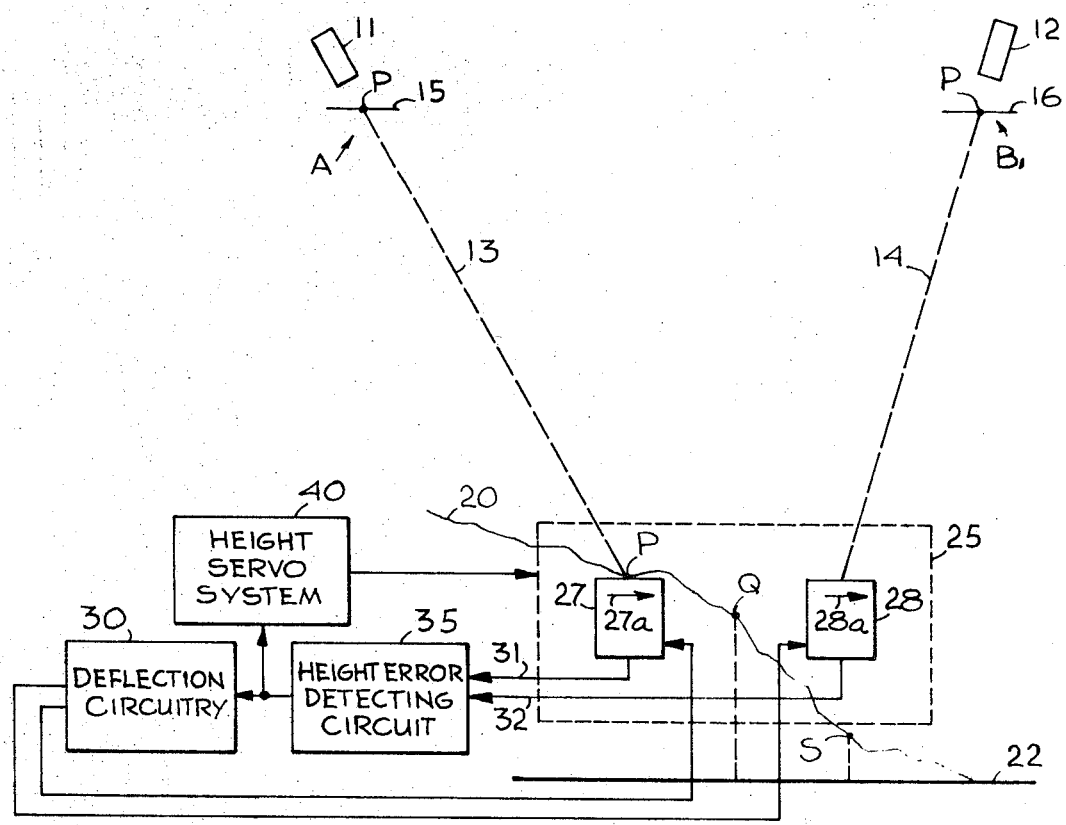
FIG. 1(b) is a simplified diagram of one embodiment of an automated stereomapping system of the present invention.

Reference is now made to FIG. 1(b) which is a simplified diagram of one embodiment of the present invention. The invention is described in conjunction with a photogrammatic instrument, such as a Kelsh plotter, on which a stereo model is projected from a pair of photographs such as photographs 15 and 16. In FIG. 1(b), like elements of those shown in FIG. 1(a) are designated by like numerals. As seen, the present invention includes a scanning assembly 25 which comprises electronic scanners 27 and 28, such as image dissectors. The photographs 15 and 16 are mounted at positions A and $B_1$, the spacing therebetween being adjusted to bring the stereoscopic model to the desired scale taking into account the distance between scanners 27 and 28. Projectors 11 and 12 at positions A and $B_1$ respectively project details of the terrain in photographs 15 and 16 unto scanners 27 and 28 respectively. Each of the scanners 27 and 28 is connected to deflection circuitry 30, which provides deflection signals to the scanners to produce identical stable scanning rasters represented by arrows 27a and 28a. Thus, the imagery detail in light beam 13 is scanned by scanner 27 to produce a related electrical signal supplied via line 31 to a height error detecting circuit 35. Similarly, the imagery detail in light beam 14 is scanned by scanner 28 which produces a related electrical signal supplied via line 32 to the circuit 35.

From FIG. 1(b) it is seen that there is only one height position of the assembly 25 at which correlating imagery elements in the two light beams 13 and 14 are coincidently scanned by the two scanning rasters of scanners 27 and 28. When the assembly 25 is at such a position, correlating elements of the two signals supplied to circuit 35 are in time coincidence, resulting in zero height error signals. However, if the height of the assembly 25 differs from such a position, then error signals are produced, which energize a servo system 40 to adjust the height of the assembly, so that correlating elements are scanned in time coincidence by the scanning rasters of the two scanners.

For explanatory purposes, let it be assumed that the assembly 25 is higher than as shown in FIG. 1(b). Then, an imagery element of light beam 13, that would be in the center of the scan for the correct elevation adjustment, will be scanned to the left of the center of scanning raster 27a, whereas the same element in light beam 14 will be scanned to the right of the center of scanning raster 28a. Assuming scanning from left to right, the two scanned elements will produce signals which are not in time coincidence, but rather the signal from scanner 27 will precede the signal from scanner 28. Conversely, if the assembly 25 is lower than shown in FIG. 1(b), correlating elements in beams 13 and 14 will be scanned relatively to the right and left of rasters 27a and 28a, respectively. Thus, the signal from scanner 28 will precede the signal from scanner 27.

The lack of time coincidence between the signals is analyzed in circuit 35, which produces an error signal in response thereto. This error signal is integrated, and the resulting integrated height error signal is supplied to the deflection circuitry 30, in order to affect the deflection signals supplied to the scanners 27 and 28. If there is a lack of time coincidence, the resulting error signal will modify the integrated error signal until the signals are in time coincidence, at which time the error signal becomes zero and the deflection signals hold at the correct compensating values. The circuitry thus compensates for height errors at electronic speeds, and the integrated height error signal serves as a height error signal that is closely proportional to the instantaneous height error and essentially independent of the nature of the imagery in the stereo field.

At the same time, the integrated height error signal is supplied to the height servo system 40, which operates to adjust the assembly to be at a height with respect to the plane 22 which corresponds to the height of point P on the surface 20 of the stereo image. As the assembly moves towards the desired height position, the amplitude of the integrated height error signal reverses, thereby constantly modifying and reducing the deflection introduced in the scanning racters with respect to one another.

For a better understanding of the details of the operation of the present invention, reference is made to FIG. 2, which is a block diagram of the improved system disclosed herein. The electrical output signals of scanners 27 and 28 are supplied to dead-time compensating circuits 41 and 42, the function of which is to provide video signals during scan flyback. An embodiment of a dead-time compensating circuit will hereinafter be described in detail.

The output of circuit 41 is supplied through an automatic gain control amplifier 41a to a delay circuit 43 and to a correlator circuit 46 which form a part of the height error detecting circuit 35. The circuit 35 also icnludes a second delay circuit 44 and a correlator circuit 45 to which is supplied the output of circuit 42 through an automatic gain control amplifier 42a. Delay circuits 43 and 44 are substantially identical and may be for an interval substantially less than the interval of a scanning line. The output of delay circuit 43 is applied to the input of correlation circuit 45, and the output of delay circuit 44 is applied to the input of correlator circuit 46. Each of the correlator circuits (45 or 46) produces an output signal which is related to the product of the amplitudes of the two input signals supplied thereto. An example of one type of a correlator circuit which can perform such a function is described in an article entitled "The Universal Automatic Map Compilation Equipment," by the present applicant, published in the March 1965 issue of the journal "Photogrammetric Engineering."

Since each correlator circuit is energized with one delayer output of one of the scanners and an undelayed output of the other scanner, if the two signals from the scanners are in time coincidence, the time relationships of the two signals supplied to each correlator circuit correspond, so that the outputs of both correlator circuits are equal. However, if the output signals from scanners 27 and 28 are not in time coincidence, then, due to the delays introduced by circuits 43 and 44, the correlation between the delayed signal and undelayed signal is improved in one correlator and made worse in the other, depending upon whether the introduced delay reduces or increases the difference in the time of occurrence of the two signals.

Reference is now made to FIGS. 3(a), 3(b), and 3(c), which are waveform diagrams useful in explaining the time relationship between the output signals of the scanners 27 and 28 as a function of the height position of the assembly 25. (In FIG. 3(a), well defined signals 51 and 52 represent the outputs of scanners 27 and 28, respectively, when the scanner assembly 25 is at the desired height; namely, correlating imagery elements are coincidently scanned by rasters 27a and 28a to produce signals 51 and 52 which are in time coincidence. In FIG. 3(b), signal 51 precedes in time signal 52, thus indicating that correlating imagery elements are not scanned coincidently by rasters 27a and 28a, but rather the raster of scanner 27 scans the correlating imagery element in light beam 13 prior to the scanning by scanner 28 of the same imagery element in light beam 14. This indicates that the assembly 25 is too high.

When signals 51 and 52 shown in FIG. 3(b) are supplied to the circuit 35, it is appreciated by one familiar with the art that by delaying signal 51 in circiut 43 the correlation in correlator 45 is improved. Concurrently, signal 52 is further delayed by circuit 44 with respect to signal 51 so that the correlation in correlator 46 is worsened.

The outputs of the two correlators are then supplied to a difference amplifier 47 (see FIG. 2). The difference output of the amplifier 47 represents the instantaneous correlation error between the two signals 51 and 52 which is related to the error in the scanning. The amplitude of the output signal represents the magnitude of the displacement, and the polarity of the signal represents the direction of error, namely, whether the scanning corresponds to a higher or lower position than the desired position. Thus, when the time relationship between signals 51 and 52 is as shown in FIG. 3(b), indicating that the scanning is too high, the output signal of amplifier 47 has a first polarity, and when the time relationship between signals 51 and 52 is as shown in FIG. 3(c), indicating that the scanning is too low, the output signal of amplifier 47 has an opposite polarity. The instantaneous output of difference amplifier 47 is supplied to an integrating amplifier 48 which integrates the signals to provide an integrated height error signal hereinbefore referred to.

Referring again to FIG. 2, this invention includes raster generating circuitry 30 which incorporates a scan generator 50 and raster deflection amplifiers 53–56. The output signals of amplifiers 53 and 55 are connected to scanner 27. The output signals of amplifiers 54 and 56 are connected to scanner 28. Amplifiers 53 and 55, in response to signals from generator 50, provide $x$ and $y$ deflection signals to the scanner 27 so that an $xy$ scanning raster may be generated therein to scan the light beam 13. Similarly, amplifiers 54 and 56, in response to signals from the generator 51, provide $x$ and $y$ deflection signals to scanner 28 in order to generate an $xy$ scanning raster therein to scan light beam 14. Amplifiers 53 and 54 are of the summing type and are also differentially connected to the ouptut of integrating amplifier 48 so that the respective $x$ deflection signals to the two scanners 27 and 28 are made dependent on a height error signal produced therein; that is, their ouptut signals are determined by the difference of their inputs respectively received from the integrating amplifier 48 and the scan generator 50. This will be explained in more detail subsequently herein.

Reference is now made to FIGS. 4(a), 4(b), and 4(c), which are scanning raster diagrams useful in explaining further the principles of operation of the present system. In FIG. 4(a), TV-like scanning rasters 61 and 62 represent the rasters generated by scanners 27 and 28, respectively, previously designated by arrows 27a and 28a. Raster 61 is generated about a center spot 63 in response to deflection signals from amplifiers 53 and 55, and raster 62 is generated about a center spot 64 in response to deflection signals from amplifiers 54 and 56. As previously explained, as long as the assembly 25 (FIG. 1) is at the proper height, correlating imagery elements in light beams 13 and 14 are scanned coincidently with respect to center spots 63 and 64 of rasters 61 and 62, respectively. However, if the assembly 25 is higher than as shown in FIG. 1, then from the foregoing it is seen that scanning raster 61 will scan a correlating imagery element relatively to the left of center spot 63, as indicated by a point 65 (FIG. 4(b)), and the same element will be scanned by raster 62 relatively to the right of center spot 64 and indicated by a point 66. Consequently, the signal 51 from scanner 27 (FIG. 3(b)) will precede signal 52 from scanner 28.

The two signals (51 and 52) when correlated in circuit 35 will produce an integrated height error signal which is used to energize amplifiers 53 and 54. The amplifiers shift the rasters 61 and 62, as indicated by dashed lines in FIG. 4(b), to center about points 65 and 66, respectively. In other words, the rasters are deflected to compensate for the error in the height of the assembly 25. Similarly, if the assembly is below the desired height, a correlating imagery element in beams 13 and 14 will be scanned by rasters 61 and 62 relatively to the right and left of spots 63 and 64, respectively, as indicated by respective points 67 and 68 of FIG. 4(c). Thus, the height error signal from circuit 35 will again shift the rasters 61 and 62 to center about points 67 and 68, as indicated by dashed lines in FIG. 4(c).

The scanners 27 and 28 together with circuit 35 and deflection circuitry 30 perform as a closed electronic loop in which rapid and accurate compensation for any height error of the assembly 25 is acomplished through electronic deflection of one or both of the scanning rasters. Therefore, the amplitude and polarity of the signal from the circuit 35 are essentially a function of only the magnitude of the height error and the direction thereof, being independent of the detail quality of the scanned imagery. In other words, the integrated height error signal from the circuit 35 is linearly related to the height error of the assembly 25.

As seen from FIGS. 1(b) and 2, the integrated height error signal is directly supplied to the height servo system 40 which, with high loop gain, modifies the height of the assembly, in accordance with the integrated height error signal. As the assembly moves towards the required height, the integrated height error signal constantly decreases, constantly modifying the deflection of the rasters. When the assembly is at the proper height, the integrated height error signal becomes zero, so that the rasters 61 and 62 again center about points 63 and 64, respectively. Since the integrated height error signal is linearly related to height error, the gain in the height servo system may be adjusted so that in areas of good imagery the assembly 25 is rapidly positioned at the desired height, with no significant reduction in tracking characteristics in areas of the stereoscopic model having less pronounced but a reasonable amount of imagery qualities. It is thus seen that by electronically compensating for assembly height error and, at the same time, mechanically adjusting the height of the assembly by means of height servo system 40, the desired height of the assembly, and in particular the scanners mounted therein, may be obtained at a speed greater than heretofore possible. Consequently, the rate of deriving height information for each terrain portion on the photographs is greatly increased.

In practice, when the improved system of the present invention is incorporated in automating a Kelsh plotter, the assembly 25 is arranged to be movable in three perpendicular directions, hereinafter defined as the X, Y, and Z axes. In FIG. 1(b), the X axis is horizontal, the Z axis is vertical in the plane of the drawing, while the Y axis is perpendicular to the plane of the drawing. Any one of presently known techniques for positioning an assembly along three perpendicular directions may be employed. Such techniques are extensively used in automatic machining systems, wherein elements are automatically positioned with respect to and along a plurality of directions.

Reference is now made to FIG. 5(a), which is a simplified diagram in which the assembly 25 is shown coupled to an X positioning assembly 71, a Y positioning assembly 72, and the height servo system 40. Assemblies 71 and 72 are used to move the assembly 25 in an XY plane in a predetermined path or profiling pattern, as diagrammed in FIG. 5(b) by a pattern 75. The assembly is first moved along the Y axis and, at the end of a profiling line, is stepped over in the X axis. The assembly may be coupled (not shown) to the projectors 11 and 12 (FIG. 1(b)) so that as the assembly traverses the stereoscopic model in the XY plane, the projectors are positioned to project imagery of successive terrain portions in the photographs along a corresponding XY profiling pattern. At successive points along the profiling pattern, the height of the assembly is automatically adjusted by means of the height servo system 40, thereby deriving height information for the successive terrain portions, as a function of the height of the assembly 25. Such height information, which may be directly provided from the height servo system 40, may be utilized directly to produce an altitude chart or contour map. Similarly, such information may be stored in the form of digital signals for later analysis by a digital computer or for controlling operations such as cutting relief models.

In addition to utilizing the height information for altitude mapping, the signals from one of the scanners 61 or 62, which at any given instant represent terrain imagery in orthographic projection, may be used to provide an orthophoto of the terrain in the stereoscopic photographs. Referring to FIG. 6, there is shown a simplified block diagram of a printing arrangement 81 comprising cathode ray tubes 82 and 83 having respective deflecting circuits 84 and 85. Photosensitive plates 86 and 87 are placed on a printer carriage 88 in front of the tubes 82 and 83, respectively.

The motion of the carriage is controlled by assemblies 71 and 72 (FIG. 5) so that at all times the incremental areas of the plates 86 and 87 opposite the cathode ray tubes 82 and 83, respectively, correspond to the relative position of the particular terrain portion which is projected from the stereoscopic photographs. The cathode ray tube 82 is unblanked by its deflection circuitry 84 in response to the video signals supplied thereto from the scanner 27 (or scanner 28). Thus, cathode ray tube 82 exposes plate 86 to provide an orthophoto similar to the sample shown in FIG. 7.

The deflection circuit 85 controls the unblanking of the electron beam in tube 83 in response to the height signals from the height servo system 40, supplied thereto through a height interval selector 91. The function of the selector 91 is to control the intensity of the unblanked electron beam of tube 83 (through circuit 85) so that altitude or height is printed in three distinct shades, such as black, gray, and white. Each shade indicates a different elevation range as selected by the selector. Thus, depending upon the height signals from system 40, which correspond to the height of a particular area in the photographs, the beam of tube 83 is unblanked to expose film 83 with one of three levels of intensity. The three shades follow in repetitive sequence for a monotonic change in elevation. FIG. 8 is an example of such an altitude chart in which data is printed in the three distinct shades. One embodiment of the height interval selector 91 may include a reversible counter which has a maximum count related to one elevation range. The output of the counter is supplied to a circuit which counts by three. Thus, when the reversible counter is filled or emptied, a pulse is sent to the count by the three-circuit, which through a D/A converter generates a contour interval signal to the deflection circuit 85.

From the foregoing it should be appreciated that in the improved system of the present invention, by employing a pair of scanners, any height error of the scanners is electronically compensated for (by shifting the rasters) so that the height error signal is a function of height error only and is substantially independent of the imagery quality. Consequently, the gain in the height servo system may be increased, to increase the response rate of the mechanical assembly to the height error, thereby providing closer tracking of the surface of the stereoscopic model. Also, since the system is substantially independent of imagery quality, the automatic operation of the system will not be disrupted except in extreme cases. Thus, with fewer interruptions in the automatic operation of the system, the rate at which the altitude chart and orthophoto are compiled is greatly increased.

In the foregoing description, the invention has been disclosed in conjunction with a Kelsh plotter. However, it should be appreciated by those familiar with the art that the invention is not limited thereto. Rather, the system may be incorporated in any stereoplotting instrument where a pair of stereoscopic photographs are used to create a stereoscopic image or model of photographed terrain portions. For example, the system may be incorporated to automate a stereoplanigraph, which is a well known stereoscopic plotting instrument. Therein, when operated manually, a spatial model created by stereoscopic projection is viewed stereoscopically through a binocular optical system containing floating or measuring marks with respect to which measurements are made. The measuring marks are moved relative to the projectors and the model by means of a three-dimensional crossslide system, and the relative motions thereof used as the coordinate data of each terrain portion. When automated in accordance with the teachings disclosed herein, one of the scanners (27 or 28) is rigidly assembled, together with appropriate lenses, as part of the optics associated with each photograph. Thus, the projected imagery of terrain portions is directly supplied to the scanners, whose video outputs are used to derive height errors in a manner hereinbefore explained.

Referring to FIG. 9, there is shown a simplified diagram of another embodiment of the automatic system of the present invention. The arrangement as shown is similar to the optical system of stereoscopic plotting instruments wherein a spatial model is viewed, together with a floating mark, through a binocular optical system. As seen, stereoscopic photographs 15 and 16, illuminated by respective lamps 95 and 96, are mounted adjacent two optical assemblies 97 and 98, respectively. Each of the optical assemblies 97 and 98 includes a floating mark 101, at least one light deflecting means 102 which is a half-silvered mirror, and a lens system 103 for optically directing both the floating mark and terrain imagery from each photograph for stereoscopic viewing in a binocular optical system 104.

When operated manually, an operator viewing the stereoscopic model through binoculars moves the floating marks by means of a three-dimensional cross-slide system 100, and the relative motions thereof are used as the coordinate data of each terrain portion. The mechanical details for accomplishing the motion control of the floating marks are well known and therefore will not be described herein. In accordance with the present invention, optical assemblies 97 and 98 also include scanners 27 and 28 and lens systems 105 so that the imagery detail which is conventionally supplied only to the binocular optical system is also reflected to the scanners.

The scanners scan the reflected images as hereinbefore described to develop height error signals as a function of lack of time coincidence in the scanning of correlating imagery. The height error signals are supplied to the height servo system 40 (FIGS. 1 and 5), which together with X positioning assembly 71 and Y positioning assembly 72 automatically control the three-dimensional cross-slide system 100. Thus, the system is automated by substantially eliminating the manual operation generally performed by an operator.

It should thus be appreciated by those familiar with the art that the teachings of the present invention are applicable to stereoscopic plotting systems in which a stereo model is actually projected by light beams and height measurements are made by a tracing platen, such as in the Kelsh plotter. The invention, however, is also applicable to systems where a spatial model is optically created and viewed through a binocular optical system, where measurements are made as a function of movements of a floating mark with respect to the stereo model.

In the foregoing description, reference is made to the height error detecting circuit 35 (FIG. 2) in which error signals are developed as a function of lack of time coincidence between two input signals (FIGS. 3(a), 3(b), and 3(c)).

As hereinbefore explained, the height error signals are used to drive a servo system 40, which changes the relative positions of two scanners with respect to a pair of photographs so that input signals to the height error detecting circuit 35 are brought into time coincidence. The change in the relative positions of the scanners is mechanically produced by the servo system which, due to its mechanical nature, has a limited time response to the input error signals. Thus, a finite time period must elapse before the scanners are mechanically positioned with respect to the photographs, so that their scanning rasters scan correlating imagery. Consequently, the rate at which coordinate information may be derived from the pair of stereoscopic photographs may be limited by the response of the mechanical servo system, since information of one of the coordinates (such as height) can only be accurately obtained after the scanners are properly positioned to provide signals in time coincidence.

Such limitation on the rate at which coordinate information may be derived can be greatly minimized by obtaining the desired coordinate information as a function of the instantaneous positions of the scanners with respect to the stereoscopic photographs, as well as the characteristics of the instantaneous integrated height error signals. As previously explained, any height error signal is used to change the positions of the scanners with respect to the photographs, as well as to electronically deflect the scanning rasters of the scanners to compensate for any error in the scanners' position from the desired position in which correlating imagery elements are coincidently scanned. Thus, the signals used to electronically modify the scanning rasters are a measure of the error in the positions of the scanners corresponding to an error in the height of the particular scanned terrain portion.

The signals used to electronically modify the scanning rasters are convertible to related height values which, together with the instantaneous positions of the scanners, may be combined to produce the desired position of the scanners without having to mechanically so position the scanners. Thus, the desired coordinate information may be derived with electronic speeds without being limited by the response of a mechanical servo system. For example, as may be seen from FIG. 10, the signals from the height error detecting circuit 35 (FIGS. 1 and 2) may be supplied to an analog-to-digital converter (A/D) 115, whose output, representing the instantaneous error in the positions of the scanners from a desired position, is supplied to an adding circuit 116. The circuit 116 is also supplied with a digital signal from an A/D converter 117 which converts the instantaneous position of the scanners as provided by the servo system 40. Thus, the output of circuit 116 to a coordinate recorder 120, representing the desired position of the scanners, is derived without the need to actually move the scanners to such a position.

As should be appreciated from the foregoing description, the error in the altitude of the scanners with respect to the stereoscopic model is represented by time displacement between correlating imagery elements of the video signals (see FIGS. 3(a), 3(b), and 3(c)). Such time displacement is compensated for, in another embodiment of the invention, by differentially delaying the video signals supplied to the height error detecting circuit 35 with respect to one another to eliminate any time displacement therebetween. Then, the desired height of the scanners is determined by combining signals representing the instantaneous position of the scanners with signals representing an amount of differential delay necessary to compensate for the time displacement between the video signals, where the time displacement represents error in the altitude of the scanners.

For a better understanding of the second embodiment of the invention utilizing differential delay techniques, reference is made to FIG. 11, which is a simplified block diagram thereof. The video signals 51 and 52 from a scanning system 130 are supplied through gain control amplifiers 41 and 42 then through a differential delay circuit 135 to a height error detecting circuit 35. The scanning system 130 may comprise a pair of electronic scanners such as scanners 27 and 28 (FIG. 1) hereinbefore described, or a scanning arrangement wherein images projected to produce the stereoscopic model are simultaneously scanned by a single scanner. Such an arrangement is described in detail in the above-mentioned copending application. Irrespective, however, of the number of scanners, the time displacement between signals 51 and 52 represents error in the position of the scanning system 130 with respect to the surface of the stereoscopic model.

Signals 51 and 52 are correlated in the height error detecting circuit 35 to provide height error signals which are then supplied to a threshold circuitry 137. The circuitry 137 produces output pulse signals of appropriate polarity whose algebraic sum instantaneously represents the magnitude of the time displacement between signals 51 and 52. The polarity of the sum of the signals represents the sense of the displacement, namely, whether signal 51 precedes in time or succeeds signal 52. The output pulse signals of circuitry 137, which may be in digital form, are supplied to a differential delay control circuit 140 of the circuit 135, which also includes tapped delay lines 141 and 142 through which signals 51 and 52 respectively are supplied to circuit 35. The control circuit 140 may comprise a reversible counter which, when energized with digital signals from circuitry 137, actuates delay lines 141 and 142 to differentially delay signals 51 and 52 to bring them into apparent time coincidence.

Assuming that the scanning system 130 is below the stereoscopic image resuling in video signals 51 and 52 having a time displacement as indicated in FIG. 3(a), namely signal 51 precedes signal 52 by $\Delta t$, then, according to the teaching of the invention, threshold circuitry will produce a digital signal of a first polarity (assumed positive) which will energize circuit 140 to differentially delay signals 51 and 52 to reduce the magnitude of $\Delta t$. A subsequent digital signal will cause additional differential delay to be introduced until $\Delta t$ is reduced to zero or a minimum time displacement which produces error signals which are insufficient to energize threshold circuitry. Thus, circuit 135 modifies the time relationship between video signals 51 and 52 so that the two signals supplied to circuit 35 are in apparent time coincidence, as indicated in FIG. 11 by signals 51a and 52a, even though the signals 51 and 52 from the scanning system are not in time coincidence.

The digital signals from the threshold circuitry 137 are counted by a reversible counter 145 whose output with respect to a reference count represents the instantaneous error in the position of the scanning system 130 with respect to the stereoscopic model. The output of counter 145 may be supplied to an adding circuit, similar to circuit 116 (FIG. 10), to be added therein with digital signals from A/D converter 117 which represent the instantaneous position of the scanning system 130. Thus, the output of adding circuit 116 represents the desired position of the scanning system 130 at the surface of the stereoscopic model without the need to actually so position the system in order to sense the desired position thereof.

The differential delay control circuit 140 may further be coupled to the height servo system 40, which controls the height of the scanning system 130, through a D/A converter 147. Thus, the signals used to produce the differential delay in video signals 51 and 52 are also used to adjust the height of the scanning system to approach the desired height. As the system 130 approaches the desired height, the actual time displacement between signals 51 and 52 decreases so that the differential delay necessary to adjust the two signals to be in apparent time coincidence is reduced. Consequently, signals from the height servo system 40 are supplied to control circuit 140 so that, as the scanning system 130 approaches the desired height at the surface of the stereoscopic model, the circuit 140 reduces the differential delay between signals 51 and 52.

As hereinbefore described, the teachings of the present invention are based on the ability to correlate video signals produced by scanning incremental areas of two stereo photographs and use the time relationship between the two signals to determine the height of the incremental areas as a function of the positions of the scanners with respect to the two photographs. When scanning the incremental areas with TV rasters of the type shown in FIG. 4(a), it is appreciated that video signals are not produced during the flyback time of the beams of the scanners, i.e., between the end of one scanning line and the start of a succeeding line. The absence of video signals during flyback, unless eliminated, produces large transient signals which greatly affect the ability to utilize the video signals from scanners 27 and 28 (FIG. 2) and reliably correlate them in circuit 35. Such limitations are overcome by the dead-time compensating circuits 41 and 42 which provide video signals during flyback time, thus eliminating any undesired transient signals.

Reference is now made to FIG. 12, which is a simplified diagram of dead-time compensating circuit 41. Circuit 42 is identical thereto. The circuit comprises a preamplifier 151 which is supplied with the video signals from scanner 27. Three single-pole double-throw switches 152, 153, and 154 are controlled by the scan generator 50 (FIG. 2) in such a manner that, when the scanning lines of rasters 61 and 62 (FIG. 4(a)) are generated, switches 152, 153, and 154 are closed on one set of contacts in the positions shown in FIG. 12. During flyback time, the switches are closed on the other set of contacts (not shown).

Thus, during each scanning line the video signals from scanner 27 are supplied to preamplifier 151, and therefrom through switch 152 to the amplifier 41a. The circuit 41 also includes an integrating element such as capacitor 155 and a resistor 156. During each scanning line the output of preamplifier 151 is supplied through switch 153 to the capacitor 155, which is charged up to a level corresponding to the integrated video signals generated during the scanning of each line. Then, during flyback, switch 154 is closed so that capacitor 155 discharges through resistor 156, thus providing amplifier 41a with a signal which represents the average of the video signals produced during the preceding scanning line. Consequently, the video signals supplied to amplifier 41a during each scanning raster are not interrupted by sharp transients, but rather are continuous with circuit 41 providing average video signals during flyback time. The dead-time compensating circuit is particularly important when scanning bright areas of imagery, since the absence of video signals during flyback would result in extremely large transients which would greatly affect the accuracy of the correlation operation.

From the foregoing description, it should be appreciated that the present invention provides an improved auto mated stereomapping system in which information or data for three coordinates of terrain portions in a pair of stereoscopic photographs is automatically derived. Two scanners, coupled to optical systems used in conventional stereoplotting instruments, are used to scan the imagery of incremental terrain positions. The signals from the scanners develop error signals used to mechanically change the positions of the scanners so that their rasters scan correlating imagery elements in time coincidence. The changes in the positions of the scanners thus represent the relative heights of the incremental terrain portions.

Two other coordinates (X and Y) for each incremental terrain portion are automatically derived from a pair of positioning assemblies (71 and 72 in FIG. 5) which move the scanners and associated optics along a profiling pattern with respect to the photographs so that, at successive points along the pattern, heights of incremental terrain portions may be derived. The use of two electronic type scanners, such as image dissectors, enables the incorporation of the teachings disclosed herein in automating stereoplotting instruments, which heretofore required skilled manual operators to view a spatial model through a binocular optical system and make measurements with respect to a reference mark. Also, the teachings may be incorporated in automatic stereomapping systems utilizing a single scanning arrangement, the operative speed of which is limited by mechanical servo limitations, as hereinbefore described.

It should be appreciated that those familiar with the art may make modifications and equivalents in the specific arrangements which have been described herein. Therefore, all such modifications and equivalents are deemed to fall within the scope of the invention as claimed in the appended claims.

The embodiments of the invention in which an exclusive property or privilege is claimed are defined as follows:

1. An improved automatic stereomapping system for deriving information from a pair of stereoscopic photographs, comprising:
   means for scanning an incremental area of each of a pair of stereoscopic photographs to develop video signals representative of corresponding scanned photographic imagery elements;
   movable assembly means for selectively positioning said means for scanning with respect to said pair of stereoscopic photographs;

correlating means for deriving error signals from said video signals which are a function of the integrated time displacement of said video signals;

means for electronically modifying the relative positions of the means for scanning the incremental areas of said pair of stereoscopic photographs for substantially eliminating the time displacement of the correlated video signals;

means for energizing said movable assembly means with said error signals to selectively modify the relative positions of said means for scanning with respect to said pair of stereoscopic photgraphs; and means for recording the relative positions of said means for scanning with respect to said pair of photographs as corresponding imagery of incremental areas of said pair of stereoscopic photgraphs is scanned in substantial time coincidence.

2. An automatic stereomapping system for developing terrain information from terrain represented in a pair of stereoscopic photographs, comprising:

scanning means;

assembly means for positioning said scanning means in relationship to said pair of stereoscopic photographs to scan incremental areas of said pair of photographs with first and second scanning rasters;

means for developing video signals as a function of scanned elements of terrain imagery;

correlating means for deriving error signals as a function of the integrated time displacement of scanned correlating imagery elements in the incremental areas of said pair of photographs scanned by said first and second scanning rasters;

means responsive to said error signals for electronically modifying said first and second scanning rasters with respect to one another to scan correlating imagery elements in substantial time coincidence;

means responsive to said error signals for varying the positions of said scanning means with respect to said pair of stereoscopic photographs to minimize the electronic modification of said first and second scanning rasters to scan in substantial time coincidence correlating imagery elements in said incremental areas; and means for recording terrain information of each incremental area in each of said pair of stereoscopic photographs as a function of the relative positions of the scanning means with respect to said pair of stereoscopic photographs as correlating imagery elements of said incremental areas are scanned in substantial time coincidence.

3. An automatic stereomapping system for developing mapping data related to the information in a pair of stereoscopic photographs, comprising:

means for scanning incremental areas of a pair of stereoscopic photographs with sequentially generated scanning lines comprising first and second predetermined rasters to develop video signals corresponding to elements of imagery of the information in said incremental areas;

correlating and integrating means for producing error signals having amplitudes indicative of the time relationships of video signals corresponding to correlating elements of imagery in said incremental areas;

electronic means responsive to said error signals for reducing the time displacement between corresponding portions of said video signals, said electronic means including means for modifying said first and second rasters to substantially scan correlating imagery elements in time coincidence;

means for mechanically modifying the positions of said means for scanning with respect to said pair of stereoscopic photographs as a function of said error signals; and recording means for recording a coordinate of each of said incremental areas as a function of the relative positions of said means for scanning with respect to said pair of stereoscopic photographs.

4. An automatic stereomapping system as recited in claim 3 wherein said means for scanning include first and second electronic scanners, with each of said first and second rasters comprising a TV-like raster of a series of sequentially generated interrupted lines, said system further including means for positioning said means for scanning with respect to said pair of stereoscopic photographs so as to scan successive incremental areas along a predetermined traverse pattern, to derive said coordinate for each of said successive incremental areas.

5. A stereomapping system for developing height information of terrain from a pair of stereoscopic photographs of the terrain by examining incremental areas, comprising:

means for forming a stereoscopic image of an incremental terrain area from said pair of photographs;

means for scanning the projected stereoscopic image with first and second scanning rasters, each raster comprising a series of seqsentially generated lines to develop respective first and second video signals indicative of imagery elements of the stereoscopic image;

height error detecting means responsive to said video signals for providing height error signals indicative of time displacement of the scanning of correlating imagery elements by said first and second scanning rasters to provide a measure of the error in the positions of said first and second scanning rasters with respect to said pair of photographs as a function of the height of said incremental area;

mechanical servo means responsive to said height error signals for mechanically adjusting the positions of said means for scanning to adjust the positions of said first and second scanning rasters with respect to said pair of stereoscopic photographs;

means for electronically modifying the relationships between said first and second scanning rasters with said height error signals to maintain the height error signals as substantially a function of the error in the positions of said means for scanning with respect to said pair of photographs;

means responsive to said mechanical servo means for recording a height coordinate of said incremental terrain area as a function of the relative positions of said first and second scanning rasters with respect to said pair of stereoscopic photographs; and means for moving said means for scanning in a predetermined traverse pattern with respect to said pair of photographs to record coordinates of successive incremental terrain areas of said stereoscopic image along said pattern.

6. A stereomapping system as recited in claim 5 wherein said height error detecting means include first and second delay means, first and second correlators, difference and integrating means, whereby said first video signal delayed by said first delay means and said second video signal are correlated in said first correlator, with said second video signal delayed by said second delay means and said first video signal being correlated in said second correlator, and means for supplying the output signals of said first and second correlators to said difference and integrating means to provide said height error signals as the integrated difference signal of the output signals of said first and second correlators.

7. A stereomapping system as recited in claim 6 wherein said means for electronically modifying, in response to said height error signals, modify the ecnters of said first and second scanning rasters with respect to one another so that correlating imagery elements of the incremental terrain area are scanned substantially in time coincidence irrespective of the error in the positions of said scanning rasters with respect to said pair of photographs.

8. A stereomapping system for developing height information of terrain in a pair of stereoscopic photographs comprising:

means for producing a stereoscopic image of an incremental terrain area from said pair of photographs:

first and second scanners each having a raster comprising a series of sequentially generated lines for scanning the projected stereoscopic image to develop first and second video signals indicative of imagery elements of the projected stereoscopic image;

height error detecting means responsive to said video signals for providing height error signals indicative of the time relationship of scanning correlating imagery elements by the rasters of said first and second scanners to provide a measure of the error in the positions of said first and second scanners with respect to said pair of photographs as a function of the height of said incremental area;

mechanical servo means responsive to said height error signals for mechanically adjusting the positions of said first and second scanners with respect to said pair of stereoscopic photographs to minimize said height error signals together with the time displacement of scanned correlating imagery elements;

means responsive to said height error signals for modifying the relationship between the rasters to control the height error signals as substantially a function of the error in the positions of said first and second scanners with respect to said pair of photographs as a function of the height of said incremental area;

means responsive to said servo means and said height error signals for recording the height of said incremental terrain area as a function of the instantaneous positions of said first and second scanners with respect to said pair of stereoscopic photographs, and the error in said positions with respect to the desired positions of said first and second scanners indicative of the time relationship of scanning correlating imagery elements of said incremental terrain area; and means for moving said means for scanning in a predetermined traverse pattern with respect to said pair of photographs so that stereoscopic images of successive incremental terrain areas along said pattern are examined to record the heights thereof.

9. A stereomapping system as recited in claim 8 wherein said height error detecting means include first and second delay means, first and second correlators, difference integrating means, whereby said first video signal delayed by said first delay means and said second video signal are correlated in said first correlator, with said second video signal delayed by said second delay means and said first video signal being correlated in said second correlator, and means for supplying said output signals of said first and second correlators to said difference integrating means to provide said height error signals as the integrated difference signal of the output signals of said first and second correlators.

10. A stereomapping system as recited in claim 9 wherein said means for scanning, in response to said height error signals, modify the centers of said first and second rasters with respect to one another so that correlating imagery elements of the incremental terrain area stereoscopically projected are scanned in substantial time coincidence irrespective of the error in the positions of said first and second scanners with respect to said pair of photographs.

11. A stereomapping system wherein a stereo model is optically produced from a pair of stereoscopic photographs, comprising:

means for electronically scanning an incremental area of said stereo model to develop video signals representative of scanned photographic image elements;

mechanical means for selectively positioning said means for scanning with respect to said stereoscopic photographs to scan successive incremental areas of said stereo model;

means for correlating said video signals to produce error signals representative of time displacement of corresponding elements in the video signals;

means responsive to said error signals to electrically modify the relative positions of the means for scanning of the incremental area to substantially eliminate the time displacement of corresponding elements in said video signals;

means for automatically controlling the mechanical means to modify the position of said means for scanning in response to said error signals; and means for recording the relative positions of said means for scanning.

12. An automatic stereomapping system for developing terrain data from terrain in a pair of stereoscopic photographs, comprising:

means for projecting a stereoscopic image of terrain from a pair of stereoscopic photographs;

means for scanning an incremental terrain area of the stereoscopic image to develop video signals representing imagery elements of terrain in the incremental terrain area;

means for correlating said video signals to provide height error signals as a function of time displacement of the video signals representing correlating imagery elements, the time displacement being a function of a difference in positions of said means for scanning and the scanned incremental terrain area of the stereoscopic image;

means responsive to said height error signals for controlling the height of said scanning means with respect to said stereoscopic photographs;

means responsive to said height error signals for electronically differentially delaying said video signals to substantially eliminate time displacement therebetween;

means for recording the instantaneous position of said means for scanning; and means responsive to the last two mentioned means for recording data of said incremental terrain area as a function of the instantaneous position of said means for scanning and the amount of differential delay required to substantially eliminate the time displacement between said video signals.

13. An automatic stereomapping system for deriving altitude data of terrain in a pair of stereoscopic photographs, comprising:

means for projecting a stereoscopic model of terrain from a pair of stereoscopic photographs;

means for scanning an incremental terrain area of the stereoscopic model to develop video signals representing imagery elements of terrains;

positioning means for varying the altitude of said means for scanning with respect to said stereoscopic model;

means for correlating said video signals to provide integrated error signals as a function of time displacement between said video signals indicative of the relative altitudes of said means for scanning and the taltiude of said incremental terrain area of said stereoscopic model;

electronic differential delay means responsive to said integrated error signals for differentially displaying said video signals to substantially eliminate time displacement therebetween; and means for recording the altitude of said incremental terrain area as a function of the instantaneous altitude of said means for scanning and the integrated error signals necessary to energize said differential delay means to substantially eliminate time displacement between said video signals.

14. An automatic stereomapping system as recited in claim 13 further including means for moving said means for scanning to traverse said stereoscopic model in a predetermined pattern for recording the relaitve altitudes of successive incremental terrain areas along said pattern by said means for recording.

15. An automatic stereomapping system as recited in claim 14 further including means for energizing said positioning means with said integrated error signal to modify the altitude of said means for scanning to conform to the altitude of the scanned incremental terrain area in said stereoscopic model.

16. An automatic stereomapping system for deriving altitude data of terrain in a pair of stereoscopic photographs, comprising:

means for producing a stereoscopic model of terrain from a pair of stereoscopic photographs, with relative altitudes of incremental areas of the model with respect to a reference plane being related to relative altitudes of corresponding terrain areas in the pair of stereoscopic photographs;

means for scanning an incremental terrain area with at least one scanning raster comprising a series of sequentially generated interrupted scanning lines to develop video signals representing imagery elements of terrain in said incremental terrain area;

servo means for controlling the altitude of said means for scanning with respect to said reference plane, to be at the altitude of the incremental terrain area being scanned;

height error detecting means including correlating circuitry and integrators for correlating said video signals to provide integrated error signals representing a time displacement between said video signals indicative of error in the altitude of said means for scanning with respect to the altitude of said incremental terrain area being scanned;

means responsive to said error signals for providing related digital signals having numerical and polarity characteristics;

differential delay means including digital counting means for differentially delaying said video signals to substantially eliminate the time displacement therebetween;

means for recording the altitude of said scanned incremental terrain area as a function of the instantaneous altitude of said means for scanning and the characteristics of said related digital signals, the number and polarity of said signals representing the magnitude and direction of the error in the instantaneous altitude of said means for scanning with respect to the altitude of said scanned incremental terrain area;

means for moving said means for scanning in a traversing pattern with respect to said stereoscopic model to scan successive incremental terrain areas of said model along said pattern;

means for energizing said servo means with said digital signals to control the altitude of said means for scanning so as to reduce the difference between the altitude thereof and the altitude of the scanned incremental terrain area; and means for energizing said differential delay means to reduce the magnitude of differentially delaying said video signals as the altitude of said means for scanning is controlled by said servo means to be equal to the altitude of said scanned incremental terrain area 17. An automatic stereomapping system for deriving data of terrain in a pair of stereoscopic photographs, comprising:

means for producing a stereoscopic model of terrain from a pair of stereoscopic photographs, the relative altitudes of incremental areas of said model with respect to a reference plane being related to relative altitudes of corresponding terrain areas in the pair of stereoscopic photographs;

means for scanning an incremental terrain area of said model with a scanning raster comprising a series of sequentially generated scanning lines to develop video signals representing imagery elements of terrain in said incremental terrain area;

height error detecting means including correlating circuitry for correlating said video signals to provide integrated error signals representing a time displacement between said video signals indicative of error in the altitude of said means for scanning with respect to the altitude of said incremental terrain area being scanned;

means responsive to said integrated error signals for providing related digital signals;

differential delay means including digital counting means for differentially delaying said video signals to substantially eliminate the time displacement therebeween;

means for recording the altitude of said scanned incremental terrain area as a function of the instantaneous altitude of said means for scanning and the characteristics of said related digital signals, the number and polarity of said signals representing the magnitude and direction of the error in the instantaneous altitude of said means for scanning with respect to the altitude of said scanned incremental terrain area;

means for moving said means for scanning in a traversing pattern with respect to said stereoscopic model so as to scan successive incremental terrain areas of said model along said pattern; and means responsive to said video signals for producing a photographic record wherein each incremental terrain area of the original photographs is in orthographic projection.

18. A system for deriving three-coordinate data for each of a large plurality of incremental areas of a three-dimensional pattern comprising:

scanning means;

means for automatically moving said scanning means in two coordinates relative to said pattern so as to provide for scanning of desired incremental areas of said pattern;

means for providing an indication of two-coordinate data for each incremental area as a function of the position of said scanning means with respect to said two coordinates;

said scanning means being operative to develop first and second electrical signals in response to the scanning of each incremental area having a relative time displacement representative of third-coordinate data for the scanned incremental area;

means for electronically modifying the relative positioning of said scanning means with respect to said third coordinate in response to the time displacement between said first and second electrical signals in a manner so as to substantially eliminate the time displacement therebetween;

means responsive to the time displacement between said first and second electrical signals for providing movement of said scanning means with respect to said third coordinate; and means responsive to the time displacement between said first and second electrical signals and to the third-coordinate position of said scanning means for providing an indication of third-coordinate data for each scanned incremental area.

19. A system for deriving three-coordinate data for each of a large plurality of incremental areas of a three-dimensional pattern comprising:

scanning means;

means for automatically moving said scanning means in two coordinates relative to said pattern so as to provide for scanning of desired incremental areas of said pattern;

means for providing an indication of two-coordinate data for each incremental area as a function of the position of said scanning means with respect to said two coordinates;

said scanning means being operative to develop first and second electrical signals in response to the scanning of each incremental area having a relative time displacement representative of third-coordinate data for the scanned incremental area;

means for correlating said first and second signals to provide a third electrical signal as a function of the time displacement therebetween;

means for providing movement of said scanning means with respect to said third coordinate in accordance with said third electrical signal;

means responsive to said third electrical signal for electronically differentiating delaying said first and second electrical signals to substantially eliminate the time displacement therebetween; and means responsive to said third electrical signal and to the third-coordinate position of said scanning means for providing an indication of third-coordinate data for each scanned incremental area.

References Cited

UNITED STATES PATENTS

| | | | |
|---|---|---|---|
| 3,244,066 | 4/1966 | Baker | 250—220(SP) |
| 3,432,674 | 3/1969 | Hobrough | 250—220(SP) |

RONALD L. WIBERT, Primary Examiner

O. B. CHEW II, Assistant Examiner

U.S. Cl. X.R.

250—220